US008036474B2

(12) United States Patent
Yamamoto

(10) Patent No.: US 8,036,474 B2
(45) Date of Patent: Oct. 11, 2011

(54) INFORMATION PROCESSING APPARATUS ENABLING AN EFFICIENT PARALLEL PROCESSING

(75) Inventor: Ryuji Yamamoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/939,494

(22) Filed: Nov. 4, 2010

(65) Prior Publication Data

US 2011/0043695 A1 Feb. 24, 2011

Related U.S. Application Data

(62) Division of application No. 11/706,153, filed on Feb. 14, 2007, now Pat. No. 7,885,472.

(30) Foreign Application Priority Data

Feb. 15, 2006 (JP) .................................. 2006-037890

(51) Int. Cl.
*G06K 9/36* (2006.01)
(52) U.S. Cl. ....................................................... 382/232
(58) Field of Classification Search .......... 382/232–253, 382/302–305, 108, 103, 173; 348/390.1–425.1; 718/100–108; 712/201, 203, 219, 228; 713/1; 708/203; 717/149, 119, 146; 711/130; 345/582, 345/473, 522, 505–506
See application file for complete search history.

(56) References Cited

U.S. PATENT DOCUMENTS

| 5,253,308 | A | 10/1993 | Johnson |
| 5,623,423 | A | 4/1997 | Lipovski |
| 5,867,608 | A | 2/1999 | Rice |
| 6,675,285 | B1 | 1/2004 | Mang et al. |
| 6,961,060 | B1 * | 11/2005 | Mochizuki et al. ........... 345/473 |
| 6,981,261 | B2 | 12/2005 | Kalafatis et al. |
| 7,165,254 | B2 | 1/2007 | Yoshida |
| 7,243,345 | B2 | 7/2007 | Ohsawa et al. |
| 7,263,604 | B2 * | 8/2007 | Gazsi et al. .................... 712/228 |
| 7,373,001 | B2 | 5/2008 | Kondo et al. |
| 7,457,484 | B2 | 11/2008 | Wakeland |
| 2005/0188189 | A1 | 8/2005 | Yeung et al. |
| 2006/0056693 | A1 * | 3/2006 | Yamazaki et al. ............. 382/173 |

(Continued)

FOREIGN PATENT DOCUMENTS

| JP | 2006-12150 | 1/2006 |
| WO | 2004/002145 | 12/2003 |
| WO | 2005/078580 | 8/2005 |

OTHER PUBLICATIONS

Notification of Reason(s) for Refusal dated Oct. 21, 2008, from corresponding Japanese Application No. 2006-037890.

(Continued)

*Primary Examiner* — Ishrat I Sherali
(74) *Attorney, Agent, or Firm* — Katten Muchin Rosenman LLP

(57) ABSTRACT

A method of processing information, includes: creating threads for respective input data streams, and switching them for processing, the threads each being for applying predetermined processing to an input data stream and storing the resulting intermediate data into a buffer; and reading multiple pieces of the intermediate data from the respective corresponding buffers to output multiple pieces of output data in parallel. The switching for processing includes: detecting the amount of intermediate data that is stored and yet to be read in the buffers when starting processing the threads; and stopping processing of the thread when the amount of the intermediate data thereof exceeds a set value, and switching processing to other threads.

8 Claims, 4 Drawing Sheets

U.S. PATENT DOCUMENTS

2009/0002379 A1 * 1/2009 Baeza et al. .................. 345/522
2009/0187713 A1 7/2009 Zedlewski et al.

OTHER PUBLICATIONS

Notification of Reason(s) for Refusal dated Nov. 4, 2009, from corresponding Japanese Application No. 2006-037890.

United States Office Action dated Jun. 22, 2010, from corresponding U.S. Appl. No. 11/706,153.
United States Notice of Allowance and Fee(s) Due (with Notice of References Cited) dated Oct. 5, 2010, from corresponding U.S. Appl. No. 11/706,153.

* cited by examiner

INFORMATION PROCESSING APPARATUS ENABLING AN EFFICIENT PARALLEL PROCESSING

BACKGROUND OF THE INVENTION

1. Field of the Invention

The present invention relates to information processing technologies. In particular, the invention relates to a method of processing information in which a plurality of pieces of input data are processed individually and output in parallel, a method of displaying moving image thumbnails, and a decoding apparatus and an information processing apparatus to which the methods are applied.

2. Description of the Related Art

With the remarkable progress of information processing technologies in recent years, information processing apparatuses that perform high-speed operations have become readily available. Likewise, technologies for processing various types of data, including images and sound, has been developed. As a result, it has been possible for users to easily acquire various types of data for reproduction and processing as desired.

Given these circumstances, technologies for processing a plurality of pieces of data of a sort in parallel and outputting the same in parallel have come into common use for the purpose of grasping the contents of vast amounts of data, comparing the results of processing, and the like. The wide spectrum of applications of such technologies includes, for example, displaying thumbnails of compression-coded moving image files in a moving image reproducing apparatus, and comparing images for the sake of image analysis on a plurality of pieces of data, such as images, sound, or temperatures, all pieces of data being acquired from multiple channels in real time.

In order for such data processing systems to achieve parallel processing, it is necessary to create threads in accordance with the number of pieces of data to process, and divide limited resources such as CPUs and memories temporally and spatially to allocate them to the individual threads. Consequently, a greater number of threads can increase the system load when an attempt is made to increase the number of thumbnails able to be displayed at a time or when an attempt is made to increase the number of input channels allowing for the comparison of more results. It has thus been difficult to increase the number of pieces of data to be output in parallel if predetermined output rates must be ensured when performing a high level of real-time processing in parallel, such as when displaying moving image thumbnails by simply reproducing a plurality of moving images as thumbnails, and when comparing time variations of a plurality of channels of data.

SUMMARY OF THE INVENTION

The present invention has been developed in view of the foregoing problem, and a general purpose thereof is to provide a technology for outputting a large number of pieces of data smoothly in parallel.

One embodiment of the present invention relates to a method of processing information. This method of processing information includes: creating threads for respective input data streams, and switching the same for processing, the threads each being for applying predetermined processing to an input data stream and storing the resulting intermediate data in a corresponding buffer; and reading a plurality of pieces of the intermediate data from the respective corresponding buffers to output a plurality of pieces of output data in parallel. The switching for processing includes: detecting the amount of the intermediate data that is stored and yet to be read in the buffers when starting to process the threads; and stopping processing of a thread when the amount of the intermediate data thereof exceeds a predetermined value, and switching processing to other threads.

Here, the "input data streams" may be data to be output continuously for certain periods of time, or streams of time-series data which are determined to be processed and output within certain allowable ranges of time. They may be any of data of compression-coded moving image files, audio files, and the like, and combinations of these, as well as various types of uncompressed data and the like. The "predetermined processing" may therefore be determined by the types of the input data streams and desired output data, and may include a plurality of processing units regardless of whether they are the same or of different types. For example, the "predetermined processing" may be decoding in the case of compression-coded data, or in the cases of other data, image analysis, audio analysis, two-dimensional profile creation, and the like. The output data may be obtained by applying necessary processing to the intermediate data. The intermediate data may simply be output.

The "threads" typically refer to processing units which exercise certain subdivided functions of processes corresponding to applications. As employed herein, however, they shall also refer to processes themselves or processing units that correspond to components to be called to exercise certain functions, as long as they correspond to some units of processing or functions.

Another embodiment of the present invention relates to a method of displaying moving image thumbnails. This method of displaying moving image thumbnails includes: creating decoding threads and drawing threads for respective compression-coded moving image files, and switching the same for processing, the decoding threads each being for decoding a moving image file and storing generated texture data in a corresponding texture buffer, the drawing threads each being for reading the texture data from the corresponding texture buffer and generating and storing image frame data in a corresponding frame buffer; and reading the image frame data on the plurality of moving image files from the respective corresponding frame buffers, and outputting the same to a display device in parallel. The switching for processing includes: detecting the amount of the texture data that is stored and yet to be read in the texture buffers when starting to process the decoding threads; and stopping decoding-related processing of the decoding thread when the amount of the texture data thereof exceeds a predetermined value, and switching processing to other threads.

Yet another embodiment of the present invention relates to a decoding apparatus. This decoding apparatus includes: an input unit which inputs coded data streams; a decoding unit which switches the plurality of data streams input to the input unit and decodes the same in succession; a plurality of buffers which are provided corresponding to the respective data streams, and temporarily store intermediate data decoded by the decoding unit; and an output unit which reads the plurality of pieces of intermediate data stored in the plurality of buffers to output a plurality of output data in parallel. Before decoding a data stream, the decoding unit detects the amount of the intermediate data that is stored and yet to be read in the corresponding buffer, and stops decoding of the data stream and starts other processing if the amount of the intermediate data exceeds a predetermined value.

Yet another aspect of the present invention relates to an information processing apparatus. This information processing apparatus includes: a plurality of buffers corresponding to a plurality of compression-coded moving image files, respectively; a processor unit which creates decoding threads and drawing threads for the respective moving image files, and switches the same for processing, the decoding threads each being for decoding a moving image file and storing generated texture data in a corresponding buffer, the drawing threads each being for reading the texture data from the buffer and generating image frame data corresponding to the moving image file; and an image display unit which displays the image frame data on the plurality of moving image files, generated by the processor unit, in parallel. When starting to process a decoding thread, the processor unit determines whether or not to continue decoding-related processing of the decoding thread depending on the amount of the texture data that is stored and yet to be read in the buffer.

It should be appreciated that any combinations of the aforementioned components, and any conversions of expressions of the present invention from/into methods, apparatuses, systems, computer programs, and the like may also be intended to constitute applicable embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
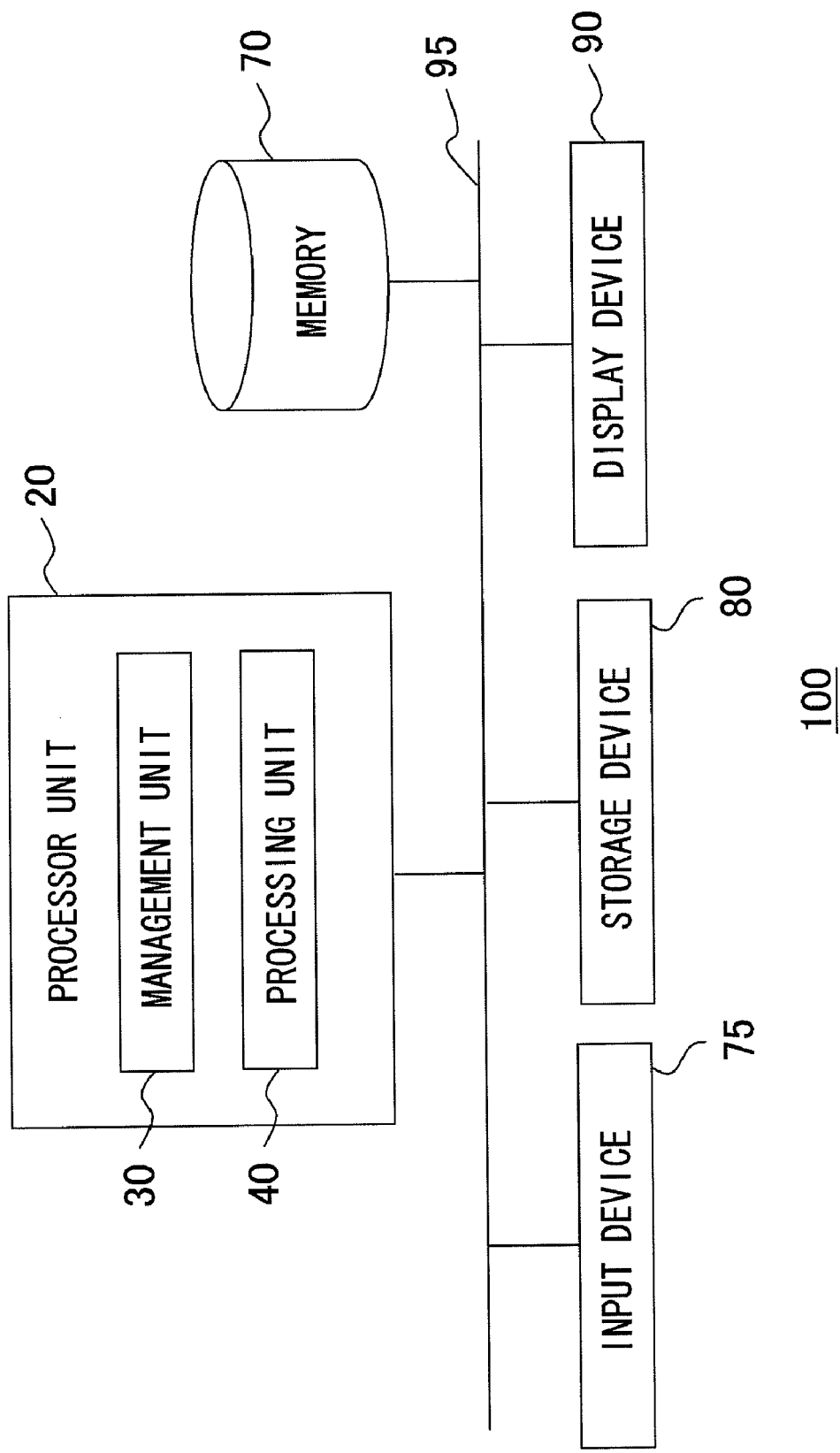
FIG. 1 is a diagram showing the configuration of an information processing apparatus according to an embodiment.

FIG. 1 shows the configuration of an information processing apparatus according to the present embodiment. The information processing apparatus 100 includes a processor unit 20, a memory 70, an input device 75, a storage device 80, and a display device 90. The processor unit 20 exercises centralized control over the entire apparatus, and performs such processing as decoding of compression-coded moving image files. The memory 70 stores running programs and data necessary for execution. The input device 75 accepts input instructions from a user. The storage device 80 stores moving image files. The display device 90 displays the frames of decoded moving image files. The processor unit 20, the memory 70, the input device 75, the storage device 80, and the display device 90 perform mutual data transmission via a bus 95.

The input device 75 may be any one of various input devices that are commonly used, such as a keyboard, a mouse, or a trackball. The storage device 80 may be a hard disk or a reader of a DVD (Digital Versatile Disk), a CD (Compact Disk) or other recording media which contain coded moving image files.

The processor unit 20 includes a management unit 30 which controls processing of the information processing apparatus 100, and a processing unit 40 which performs processing under the management of the management unit 30. The management unit 30 controls the data input/output of the processor unit 20 from/into the memory 70, the input device 75, the storage device 80, and the display device 90. It also schedules processing in the processing unit 40, and exercises control so that a plurality of processes or threads is switched for processing.

The storage device 80 contains a plurality of compression-coded moving image files, which is stored in the memory 70 under the control of the management unit 30 when the input device 75 receives a user instruction to display moving image thumbnails. The processing unit 40 decodes the plurality of moving image files stored in the memory 70 in parallel, and generates image frame data to be output finally with respect to each of the moving image files. The management unit 30 then exercises control so that the generated image frame data is successively output to areas provided for the respective moving image files on the screen of the display device 90. As a result, a plurality of moving image thumbnails appears on the display device 90.

The compression coding may be based on any one of the typical compression coding methods such as MPEG4, H.264/AVC, and SVC (Scalable Video Coding).

In the present embodiment, the decoding processing for displaying the moving image thumbnail of one moving image file is performed by one thread.

To display the moving image thumbnails of a plurality of moving image files, the processing unit 40 therefore runs a plurality of threads for decoding the plurality of moving image files in parallel. Moreover, the processing unit 40 also runs threads for generating image frame data based on the decoded data in parallel with running processes or threads other than those used for displaying moving image thumbnails. The processing unit 40 may be composed of a plurality of sub processors. Even in this instance, the management unit 30 allocates time-sharing threads to respective sub processors, thereby controlling the plurality of threads for parallel processing.

This information processing apparatus 100 runs an operating system (hereinafter, abbreviated as OS) which provides functions and environment for making effective use of the information processing apparatus 100, and exercises centralized control over the entire apparatus. A plurality of pieces of application software (hereinafter, referred to simply as applications) is run on the OS. For example, the management unit 30 can perform thread scheduling by simply utilizing the OS which is implemented in typical multithread-capable apparatuses.

Figure 2:
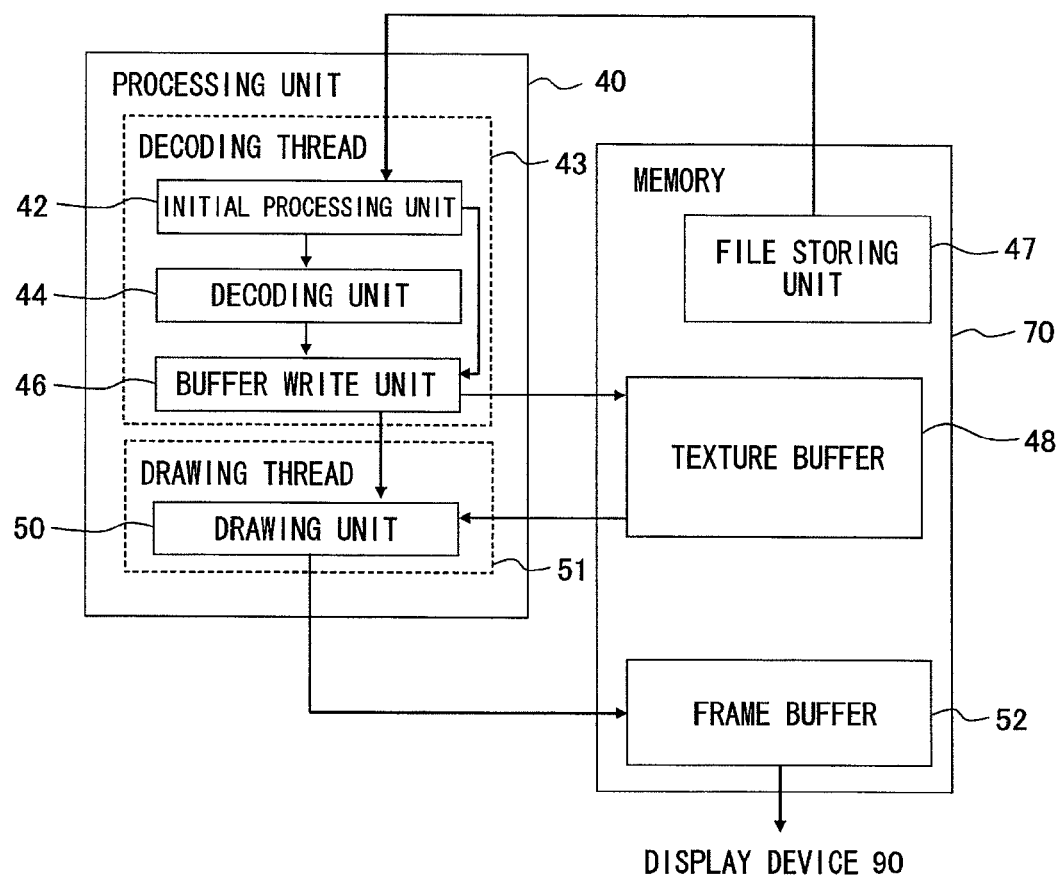
FIG. 2 is a diagram showing the configuration of the processing unit when displaying a moving image thumbnail according to the present embodiment.

FIG. 2 shows components intended for displaying a moving image thumbnail in the processing unit 40 and the memory 70. In FIG. 2 and in the processor unit 20 and the like shown in FIG. 1, the individual elements shown as functional blocks for performing various types of processing can be constituted by a CPU, a memory, and other LSIs in terms of hardware. In terms of software, they can be achieved by programs and the like that have image processing functions. It will thus be understood by those skilled in the art that these functional blocks may be made up of various forms, including hardware alone, software alone, or any combinations of these, but not limited to any one of them.

Among the blocks of the processing unit 40 shown in FIG. 2, those enclosed by the broken line represent functional blocks for processing a decoding thread 43, which is a thread for decoding one moving image file. As described above, according to the present embodiment, the thread for performing decoding processing is created for each moving image file. In fact, there is a plurality of decoding threads that have the same configuration as that of the decoding thread 43, and the individual threads exercise their functions in respective time slices allocated by the OS. A drawing unit 50 also creates a drawing thread 51 for each moving image file, so that image frame data is generated on different moving image files in respective time slices.

The processing unit 40, as mentioned previously, can also process threads other than the threads shown in FIG. 2, i.e., those threads used for displaying moving image thumbnails. In this case, the processing unit 40 exercises other functions in some time slices. Such functional blocks will be omitted from the diagram, however, since their functions are not particularly limited in the present embodiment.

The memory 70 includes a file storing unit 47, a texture buffer 48, and a frame buffer 52. The file storing unit 47 contains compression-coded moving image files. The texture buffer 48 stores texture data on each frame. The frame buffer 52 stores image frame data to be displayed on the display device 90. The texture buffer 48 and the frame buffer 52 may be formed in reserved areas of an additional graphic memory (not shown). The texture buffer 48 and the frame buffer 52 are allocated to individual moving image files. The decoding threads 43 and the drawing threads 51 use the individual areas in the texture buffer 48 and the frame buffer 52, which are allocated to the respective corresponding moving image files. In the following description, the individual areas in the texture buffer 48 and the frame buffer 52 will also be referred to as the texture buffer 48 and the frame buffer 52.

The processing unit 40 includes an initial processing unit 42, a decoding unit 44, and a buffer write unit 46 which serve as a decoding thread 43 for a moving image file. The initial processing unit 42 acquires a compression-coded moving image file from the file storing unit 47 of the memory 70. The decoding unit 44 decodes the coded moving image file. The buffer write unit 46 stores the decoded data in the texture buffer 48 as texture data. The processing unit 40 also includes a drawing unit 50 which serves as a drawing thread 51. The drawing unit 50 reads texture data from the texture buffer 48, generates image frame data, and writes it to the frame buffer 52.

As will be described later, the initial processing unit 42 also makes a determination on whether or not to continue subsequent processing, based on the number of frames of texture data stored in the texture buffer 48. The buffer write unit 46 may apply necessary processing such as RGB conversion to the data decoded by the decoding unit 44 when rendering it into texture data. The drawing unit 50 performs necessary processing such as texture mapping to polygons depending on the type of the moving image file, thereby generating image frame data. The drawing unit 50 may read data necessary for generating the image frame data, excluding the texture data, from the memory 70 when needed.

A description will now be given of operations for achieving the present embodiment using the aforementioned configurations. In the present embodiment, the decoding threads 43 in the processing unit 40 modify their own processing times to increase the efficiency of processing for displaying a plurality of moving image thumbnails. For the sake of demonstrating the effect of the present embodiment, a description will first be given of the case where time slices allocated by a typical OS are used without modification.

Figure 3:
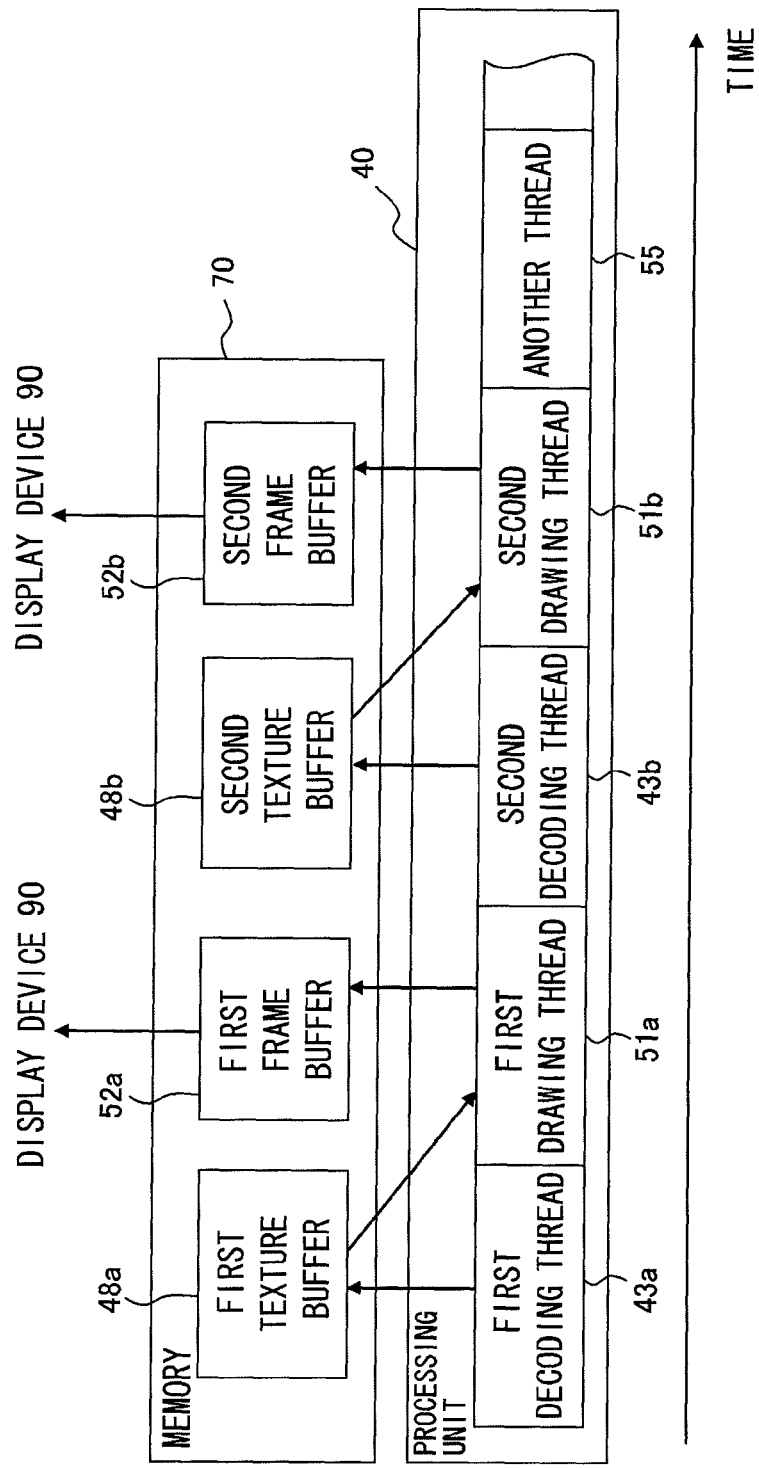
FIG. 3 is a diagram schematically showing how threads are switched in the processing unit according to the present embodiment.

FIG. 3 schematically shows an example of thread switching in the processing unit 40.

The horizontal direction of the diagram corresponds to the time axis. A first decoding thread 43*a*, a first drawing thread 51*a*, a second decoding thread 43*b*, a second drawing thread 51*b*, and another thread 55, or a thread other than for displaying a moving image thumbnail, are processed in respective time slices in succession. In reality, the order of processing may vary with priority-based scheduling by the OS. For example, the first decoding thread 43*a* may be followed by the thread 55.

When the allocated processing times end, the threads free their CPU allocations and enter an execution queue to stand by until the next processing time arrives. The decoding threads 43 and the drawing threads 51 are not limited to two, or to the first and second threads each, but are created for as many as the number of moving image files to be thumbnailed. It should be appreciated that all the threads repeat processing even after the times shown in the figure.

The buffer write unit 46 of the first decoding thread 43*a* stores texture data on a moving image in a first texture buffer 48*a*, or in an area allocated in the texture buffer 48, frame by frame. While the first decoding thread 43 enters the queue, the first drawing thread 51*a* starts processing. The drawing unit 50 consumes the texture data in the first texture buffer 48*a* frame by frame to generate image frame data on that moving image, and stores it in a first frame buffer 52*a*, or in an area allocated in the frame buffer 52. These processes are repeated to display the moving image thumbnail of one moving image file on the display device 90.

Similarly, the second decoding thread 43*b* stores texture data in a second texture buffer 48*b*, and the second drawing thread 51*b* consumes it to store image frame data in a second frame buffer 52*b*. The moving image thumbnail of another moving image file is thus displayed on the display device 90.

If not all the texture data stored in the texture buffers 48 can be consumed by the respective drawing threads 51 in a single processing time, the remaining texture data is simply left in the texture buffers 48. Then, the buffer write units 46 of the respective decoding threads 43 store the newly-generated texture data in the texture buffers 48 as well.

When storing texture data in the texture buffers 48, the buffer write units 46 activate counters (not shown) for counting the numbers of frames of the texture data stored in the texture buffers 48. If the processing unit 40 is processing a decoding thread 43 in one time slice and the buffer write unit 46 detects from the corresponding counter that the texture buffer 48 is full or is becoming full, then the decoding thread 43 frees its CPU allocation and enters the execution queue, even during the time slice. As will be described later, in the present embodiment, the counters are also consulted by the initial processing units 42.

The rates at which the decoding units 44 decode moving image files vary depending on the original images. Take, for example, moving image files that are predictive-coded using differential images between actual images and images predicted from reference frames. Then, the amount of operations varies between scenes that are almost motionless and scenes that contain quick motions or significant color changes. The decoding rates are higher in the former cases. The decoding rate can also vary from one scene to another even in a single moving image file. Moreover, if a plurality of moving image files is reproduced simultaneously like when displaying moving image thumbnails, the moving image files have different decoding rates at the same point in time.

Figure 4:
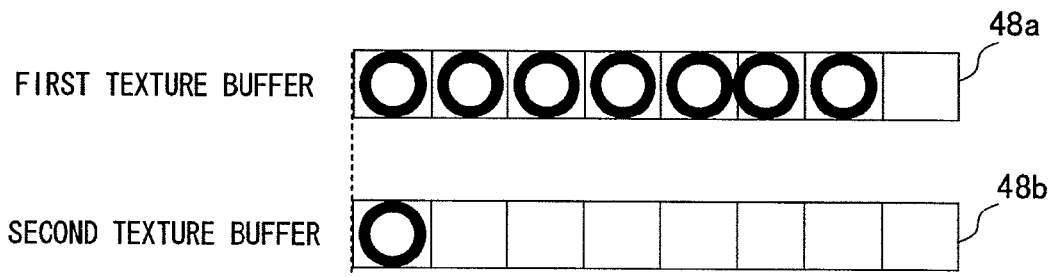
FIG. 4 is a diagram for explaining the states of texture data stored in two texture buffers according to the present embodiment.

FIG. 4 schematically shows the states of texture data stored in two texture buffers, or the first texture buffer 48*a* and the second texture buffer 48*b*, to be used by the decoding threads for two moving image files of different decoding rates, or the first decoding thread 43a and the second decoding thread 43b, at one point in time. In this instance, the first decoding thread 43a shall decode a moving image file that has a higher decoding rate, and the second decoding thread 43b shall decode a moving image file that has a lower decoding rate.

In the shown example, the first texture buffer 48a and the second texture buffer 48b allocated for the respective threads are capable of storing eight frames of texture data each. Here, the rectangles represent a single frame each. The symbol "○" shown in the single-frame rectangles indicates the number of frames of texture data that are stored and yet to be consumed in the texture buffers 48. In the shown example, the first texture buffer 48a contains seven frames of texture data, and the second texture buffer 48b contains one frame of texture data.

In general, the OS allocates processing times to respective threads uniformly. Therefore, the first decoding thread 43a having a higher decoding rate can process more frames than the second decoding thread 43b does in one processing time. Furthermore, it is more likely for the first decoding thread 43a to fill up the allocated first texture buffer 48a and free its CPU allocation before the completion of the time slice. In the environment where a plurality of sub processors processes a plurality of threads in parallel, the first decoding thread 43a therefore enters the queue more frequently than the second decoding thread 43b does. Even in this case, the OS gives the same priority to the first decoding thread 43a and the second decoding thread 43b since the two are the same threads for "decoding a moving image file." As a result, the number of times the first decoding thread 43a is processed becomes greater than the number of times the second decoding thread 43b is processed.

For the foregoing reasons, as shown in FIG. 4, the first texture buffer 48a allocated for the first decoding thread 43a consistently comes to store a larger amount of texture data than the second texture buffer 48b allocated for the second decoding thread 43b does. Furthermore, under such circumstances, only a small amount of texture data on the moving image file corresponding to the second decoding thread 43b can be accumulated. It may thus sometimes be impossible to generate a sufficient number of pieces of image frame data even when the corresponding second drawing thread 51b starts processing. This increases the possibility that the image frame data fails to meet the output timing of the display device 90 and the moving image thumbnail drops frames.

To prevent moving image thumbnails from dropping frames, the OS may be operated to assign priorities dynamically upon scheduling, such as by giving higher priorities to decoding threads of moving image files that have low decoding rates. Nevertheless, this can sometimes lower the priorities of other processes that do not pertain to displaying moving image thumbnails relatively. Since it is undesirable that other essential processes be unstable in priority, the present embodiment incorporates the priorities and schedules provided by typical OSes without change while achieving a reduction in the number of moving image thumbnail frames dropped.

As mentioned above, the decoding thread having a higher decoding rate and the decoding thread having a lower decoding rate cause a difference in the amount of texture data accumulated in the texture buffers 48. The present embodiment utilizes this difference to give priority to the decoding thread of a lower decoding rate among the group of "decoding threads" for processing. Furthermore, the priorities are adjusted in real time since the decoding rates vary from one scene to another.

Specifically, a first threshold F1 and a second threshold F2 (where F1<F2) are provided for the amount of texture data to be stored in each texture buffer 48. In this instance, the second threshold F2 has the same capacity, or comparable capacity, as that allocated for the texture buffer 48. Then, if once the amount of texture data stored exceeds the second threshold F2, yield processing is performed until the amount of texture data stored falls to or below the first threshold F1. In the yield processing, decoding is skipped to free CPU allocation and processing is passed (hereinafter, referred to as yielded) to the next thread. When the texture data is consumed by a drawing unit 50 and the amount of texture data stored falls to or below the first threshold F1, the decoding processing is resumed and continued until the stored amount exceeds the second threshold F2 again.

Figure 5:
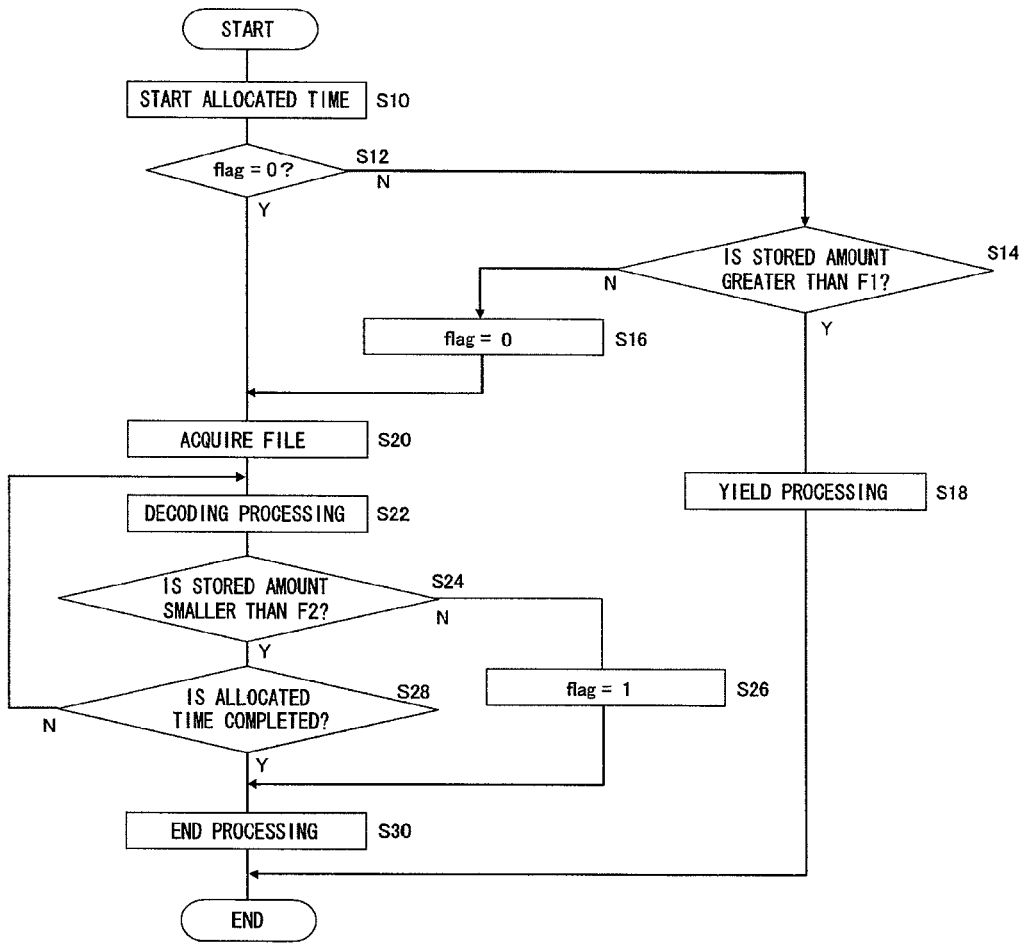
FIG. 5 is a flowchart showing a procedure in a processing time allocated for a decoding thread according to the present embodiment.

FIG. 5 shows the procedure in the processing time allocated for a decoding thread 43 according to the present embodiment. Initially, the time allocated by the OS for the decoding thread 43 starts (S10). The initial processing unit 42 checks a flag value which is stored in a register or the like (not shown) (S12). The flag value is "0" when the decoding thread 43 is in its initial state, such as immediately after the function for displaying a moving image thumbnail is activated by a user. If the flag value is "0" (Y at S12), the initial processing unit 42 acquires a moving image file to be decoded from the memory 70 (S20). Then, the decoding unit 44 and the buffer write unit 46 perform decoding and writing to the texture buffer 48 as normal (S22).

When writing texture data, the buffer write unit 46 consults the counter to check if the number of frames of texture data stored in the texture buffer 48 reaches the second threshold F2 (S24). If the stored amount is smaller than the second threshold F2 (Y at S24), the decoding processing is continued until the time allocated for this thread is completed (N at S28, S22). If the amount of texture data stored reaches the second threshold F2 (N at S24), the flag value is set to "1" (S26). Under the control of the OS, processing such as saving register values to the memory 70 is performed to end the thread processing (S30). Step S30 is also performed when the allocated time is completed before the amount of texture data stored reaches the second threshold F2 (Y at S28).

If the flag value is "1" at the beginning of processing of the decoding thread 43 (N at S12), the initial processing unit 42 detects the number of frames of texture data stored in the texture buffer 48 by using the counter which is managed by the buffer write unit 46. Then, the initial processing unit 42 checks if the number of frames stored is greater than the first threshold F1 (S14).

The first threshold F1 is determined as appropriate by calculation or by experiment based on such factors as the coding method of the moving image file to be decoded and the required frame rate. For example, in the texture buffers 48 shown in FIG. 4, a first threshold F1 is set to two frames with respect to a memory capacity of eight frames. In the example of FIG. 4, assuming the first threshold F1 is two frames, the first texture buffer 48a contains texture data having a greater number of frames than the threshold, and the second texture buffer 48b contains texture data having a smaller number of frames than the threshold.

If the amount of texture data stored is greater than the first threshold F1 (Y at S14), yielding is performed since the amount of texture data accumulated is sufficient to generate image frame data. In this instance, ordinary OS-based thread switching is performed, accompanied by such processing as saving the register values to the memory 70 (S18). This processing may actually be performed by the OS calling its own functions.

If the amount of texture data stored is smaller than or equal to the first threshold F1 (N at S14), the initial processing unit 42 sets the flag value to "0" (S16). Then, the foregoing steps S20 to S30 are performed to accumulate texture data.

Using the foregoing procedure, the decoding threads 43 in turn can yield by themselves to reduce consumption of the processing times when processing moving image files or certain scenes of higher decoding rates. The suppression increases the numbers of times other threads are processed, and by extension the number of times other decoding threads of lower decoding rates are processed per unit time which translates into higher priorities of the other decoding threads. In this instance, the priorities determined by the OS are still unchanged. The priorities of the threads for decoding the moving image files are therefore unaffected relative to the other threads, and unstable factors such as delayed operation of other processes will not occur.

Consider that in some instances some moving image files or scenes require a long time to decode, that is, only a small number of frames of texture data can be generated therefrom in one processing time. Since the number of times the threads for decoding such files or scenes are processed per unit time is increased, it is possible to increase the amount of texture data to be stored in the texture buffers 48. Meanwhile, decoding threads with higher decoding rates perform yielding so that only their texture data is consumed, and the amount of data stored in the texture buffers 48 decreases once. The threads resume storing texture data when the amount of data stored is reached the first threshold F1, or the minimum limit of not running short.

Then, the decoding threads with higher decoding rates continue their decoding processing until the stored amount of data reaches the second threshold F2. Since decoding threads that come to yield once have a sufficient amount of texture data accumulated, they can perform yielding continuously to yield a large block of time to other threads even when their allocated time arrives. The decoding threads with lower decoding rates can thus utilize the yielded time for efficient decoding processing.

In consequence, a sufficient amount of texture data for the drawing units 50 to generate image frame data is stored in any of the texture buffers 48 that are allocated for the decoding threads 43. It is therefore possible to reduce the number of moving image thumbnails frames dropped.

The present embodiment was applied to an actual case of displaying 25 moving image thumbnails. When OS-based processing time control was exercised alone without the application of the present embodiment, a total of 20 to 30 dropped frames per second was observed from the 25 moving images. In contrast, the application of the present embodiment could suppress dropped frames to a level of several frames per second in total. At such a level, it is extremely unlikely that users would notice the dropped frames visually.

According to the present embodiment described above, when displaying a plurality of moving image thumbnails, threads for displaying moving images with higher decoding rates and threads for displaying moving images with lower decoding rates are determined by detecting the amount of texture data stored in the texture buffers in real time. Then, the decoding threads with higher decoding rates quit their decoding processing and yield even when their OS-based processing times are started. The yielding is performed without running short of texture data. Consequently, it is possible to make effective use of the processing time to increase the number of times the threads for decoding moving images with lower decoding rates are processed per unit time, and therefore reduce the number of dropped frames ascribable to insufficient accumulation of texture data.

The present embodiment can provide an increase in the processing speed for displaying moving image thumbnails substantially through software improvements. This improvement can thus be implemented at a lower cost when compared to cases where the processing speed is improved through improvements to hardware such as a CPU or a bus. Moreover, since the OS has to only undertake ordinary operations, the present embodiment can be applied to various types of apparatuses used for general purposes, ranging from mobile terminals to large-scale systems.

Up to this point, the present invention has been described in conjunction with the aforementioned embodiment thereof. The foregoing embodiment has been given solely by way of illustration. It will be understood by those skilled in the art that various modifications may be made to combinations of the foregoing components and processes, and all such modifications are also intended to fall within the scope of the present invention.

For example, the present embodiment has dealt with the case where the threshold for the amount of buffering for the decoding threads to yield is determined in advance. Alternatively, the threshold may be determined automatically in an adaptive fashion while displaying moving image thumbnails, depending on such factors as the coding methods of the moving image files and the display device.

The present embodiment has also dealt with the case where the processing times are transferred between a plurality of decoding threads which is created to display a plurality of moving image thumbnails. The same processing can also be applied to any processes as long as they create a plurality of threads each of which generates output to respective buffers allocated thereto and threads which consume data stored in the respective buffers. Examples of the possible applications include: multiple input and output devices which perform rendering, sound processing, and the like and output each of a plurality of pieces of real-time data that are input from an external device such as a camera, a microphone, or a temperature sensor; and processing for making a plurality of outputs based on a plurality of pieces of data that are acquired from a plurality of network computers.

For apparatuses that perform such processing, the present embodiment is particularly effective in instances where it is difficult to change the priorities of respective threads determined by the OS, such as when additional processes are in operation.

The present embodiment has dealt with the procedure intended for multithreads of the preemptive type in which the OS allocates the same processing times to the respective threads. Alternatively, the present embodiment may also be applied to multithreads of the non-preemptive type in which the threads free their CPU allocations to switch thread processing at predetermined processing timing. Even in this case, different decoding rates result in different numbers of times for threads to enter the execution queue. Therefore, the numbers of times decoding threads with lower decoding rates perform processing can be increased by yielding of decoding threads with higher decoding rates. As a result, it is possible to provide the same effects as those of the present embodiment. In this instance, the processing for checking the completion of allocated time at S28 of FIG. 5 may be replaced with processing for checking if some process is performed at the switching timing. Alternatively, the timing when the amount of texture data stored reaches F2, or N at S24, may be used as the switching timing.

What is claimed is:

1. A method of displaying moving image thumbnails comprising:

creating decoding threads and drawing threads for respective compression-coded moving image files, and switching the threads for processing, the decoding threads each being for decoding a moving image file and storing generated texture data in a corresponding texture buffer, the drawing threads each being for reading the texture data from the corresponding texture buffer and generating and storing image frame data in a corresponding frame buffer; and reading the image frame data on the plurality of moving image files from the respective corresponding frame buffers, and outputting the image framed data to a display device in parallel, wherein the switching for processing includes:

detecting the amount of the texture data that is stored and yet to be read in the texture buffers when starting to process the decoding threads; and stopping decoding-related processing of the decoding thread when the amount of the texture data thereof exceeds a predetermined value, and switching processing to other threads.

2. An information processing apparatus comprising:

a plurality of buffers corresponding to a plurality of compression-coded moving image files, respectively;

a processor unit which creates decoding threads and drawing threads for the respective moving image files, and switches the threads for processing, the decoding threads each being for decoding a moving image file and storing generated texture data in a corresponding buffer, the drawing threads each being for reading the texture data from the buffer and generating image frame data corresponding to the moving image file; and an image display unit which displays the image frame data on the plurality of moving image files, generated by the processor unit, in parallel, wherein when starting to process a decoding thread, the processor unit determines whether or not to continue decoding-related processing of the decoding thread depending on the amount of the texture data that is stored and yet to be read in the buffer.

3. The information processing apparatus according to claim 2, wherein the processor unit stops the decoding-related processing of the decoding thread when the amount of the texture data that is stored and yet to be read in the buffer exceeds a predetermined value, and switches processing to other threads.

4. The information processing apparatus according to claim 2, wherein the threads for the processor unit to switch include a thread other than the decoding threads and the drawing threads.

5. The information processing apparatus according to claim 2, wherein the decoding threads created for the plurality of respective moving image files have the same priority when processed by the processor unit.

6. The information processing apparatus according to claim 3, wherein the processor unit continues decoding-related processing of the decoding thread until the texture data that is stored and yet to be read in the buffer reaches a predetermined amount when and after the amount of the texture data falls to or below the predetermined value, even if the amount of the texture data exceeds the predetermined value.

7. The information processing apparatus according to claim 3, wherein the predetermined value is set in accordance with a frame rate necessary for displaying the image frame data on the image display unit.

8. A non-transitory computer-readable medium storing a computer program for making a computer exercise the functions of:

creating decoding threads and drawing threads for respective compression-coded moving image files, and switching the threads for processing, the decoding threads each being for decoding a moving image file and storing generated texture data into a texture buffer, the drawing threads each being for reading the texture data from the corresponding texture buffer and generating and storing image frame data into a corresponding frame buffer; and reading the image frame data on the plurality of moving image files from the respective corresponding frame buffers, and outputting the image frame data to a display device in parallel, the function of switching for processing further includes the functions of:

detecting the amount of the texture data that is stored and yet to be read in the texture buffers when the decoding threads start processing; and stopping decoding-related processing of the decoding thread when the amount of the texture data thereof exceed a predetermined value, and switching processing to other threads.

* * * * *